United States Patent
Chang

(10) Patent No.: US 8,061,877 B2
(45) Date of Patent: Nov. 22, 2011

(54) PRISM SHEET HAVING PARALLELOGRAM MICROSTRUCTURES

(75) Inventor: Shao-Han Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 307 days.

(21) Appl. No.: 12/200,859

(22) Filed: Aug. 28, 2008

(65) Prior Publication Data
US 2009/0244907 A1 Oct. 1, 2009

(30) Foreign Application Priority Data

Mar. 28, 2008 (CN) .......................... 2008 10 300772

(51) Int. Cl.
*F21V 5/02* (2006.01)
*G02B 5/04* (2006.01)

(52) U.S. Cl. .......................... 362/339; 362/330; 359/837

(58) Field of Classification Search .......... 362/617–620, 362/338–340, 26, 29, 30, 330–333, 606, 362/607, 627, 628, 558, 616; 385/146; 359/831, 359/837, 599, 625
See application file for complete search history.

(56) References Cited

U.S. PATENT DOCUMENTS

| | | | | |
|---|---|---|---|---|
| 1,950,560 A * | 3/1934 | Martinek et al. | ............... | 359/533 |
| 2,904,673 A * | 9/1959 | Guth, Sr. | ......................... | 362/330 |
| 3,096,032 A * | 7/1963 | Davis | ........................... | 362/330 |
| 3,129,895 A * | 4/1964 | Franck | .......................... | 362/330 |
| 3,373,275 A * | 3/1968 | High | ............................. | 362/330 |
| 3,716,710 A * | 2/1973 | Clostermann et al. | ........ | 362/339 |
| 3,764,800 A * | 10/1973 | Clostermann | ................. | 362/330 |
| 7,686,474 B2 * | 3/2010 | Chou et al. | .................... | 362/237 |
| 2006/0256582 A1* | 11/2006 | Chuang | .......................... | 362/620 |

* cited by examiner

*Primary Examiner* — Alan Cariaso
(74) *Attorney, Agent, or Firm* — Altis Law Group, Inc.

(57) ABSTRACT

An exemplary prism sheet includes a transparent main body. The transparent main body includes a first surface and a second surface. The first surface and the second surface are on opposite sides of the main body. The first surface of transparent main body is flat. The second surface defines a plurality of parallelogram microstructures. Each parallelogram microstructure defines four adjacent triangular pyramid depressions.

8 Claims, 8 Drawing Sheets

PRISM SHEET HAVING PARALLELOGRAM MICROSTRUCTURES

CROSS-REFERENCE TO RELATED APPLICATION

This application is related to two co-pending U.S. patent applications Ser. No. 12/186,529, file on Aug. 6, 2008, and entitled "PRISM SHEET", and Ser. No. 12/195,444, file on Aug. 21, 2008, and entitled "PRISM SHEET". The inventor of the co-pending applicattions is Shao-Han Chang. The co-pending applications have the same assignee as the present application. The Specification and Drawings of the co-pending application is incorporated herein by reference

BACKGROUND OF THE INVENTION

1. Field of the Invention

The present invention relates to a prism sheet, particularly to a prism sheet employed in a backlight module.

2. Description of the Related Art

Referring to FIGS. 7 and 8, a typical direct type backlight module 100 includes a frame 11, a plurality of light sources 12, a light diffusion plate 13 and a prism sheet 10. The light sources 12 are disposed in an inner side of the frame 11. The light diffusion plate 13 and the prism sheet 10 are disposed on the light sources 12 above a top of the frame 11 in that order. The light diffusion plate 13 includes a plurality of diffusing particles (not shown) configured for diffusing light. The prism sheet 10 includes a transparent substrate 101 and a prism layer 103 formed on a surface of the transparent substrate 101. The prism layer 103 forms a plurality of elongated V-shaped ridges 105.

In use, light from the light sources 12 enters the diffusion plate 13 and becomes scattered. The scattered light leaves the diffusion plate 13 to the prism sheet 10. The scattered light then travels through the prism sheet 10, and is refracted out at the elongated V-shaped ridges 105 of the prism sheet 10.

The refracted light leaving the prism sheet 10 is concentrated at the prism layer 103 and increases the brightness (illumination) of the prism sheet 10. The refracted light then propagates into a liquid crystal display panel (not shown) disposed above the prism sheet 10.

However, although light from the light sources 12 enters the diffusion plate 13 and becomes scattered, after the light leaves the prism sheet 10, strong light spots of the light sources 12 direct above the light sources 12 are often formed.

In order to reduce or eliminate the strong light spots of the light sources 12, the backlight module 100 should further include an upper light diffusion film 14 disposed on the prism sheet 10. However, although the upper light diffusion film 14 and the prism sheet 10 are in contact with each other, a plurality of air pockets may still exist around the boundaries of the light diffusion film 14 and the prism sheet 10. When the backlight module 100 is in use, light passes through the air pockets, and some of the light undergoes total reflection by the air pockets along one or another of the corresponding boundaries. In addition, the upper light diffusion film 14 may absorb a certain amount of the light from the prism sheet 10. As a result, a brightness of light illumination of the backlight module 100 is reduced.

Therefore, a new prism sheet is desired in order to overcome the above-described shortcomings.

SUMMARY

A prism sheet includes a transparent main body. The transparent main body includes a first surface and a second surface. The first surface and the second surface are on opposite sides of the main body. The first surface of transparent main body is flat. The second surface defines a plurality of parallelogram microstructures and each parallelogram microstructure defines four adjacent triangular pyramid depressions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet. Moreover, in the drawings, like reference numerals designate corresponding parts throughout several views, and all the views are schematic.

DETAILED DESCRIPTION OF THE EXEMPLARY EMBODIMENTS

Reference will now be made to the drawings to describe exemplary embodiments of the present prism sheet in detail.

Figure 1:
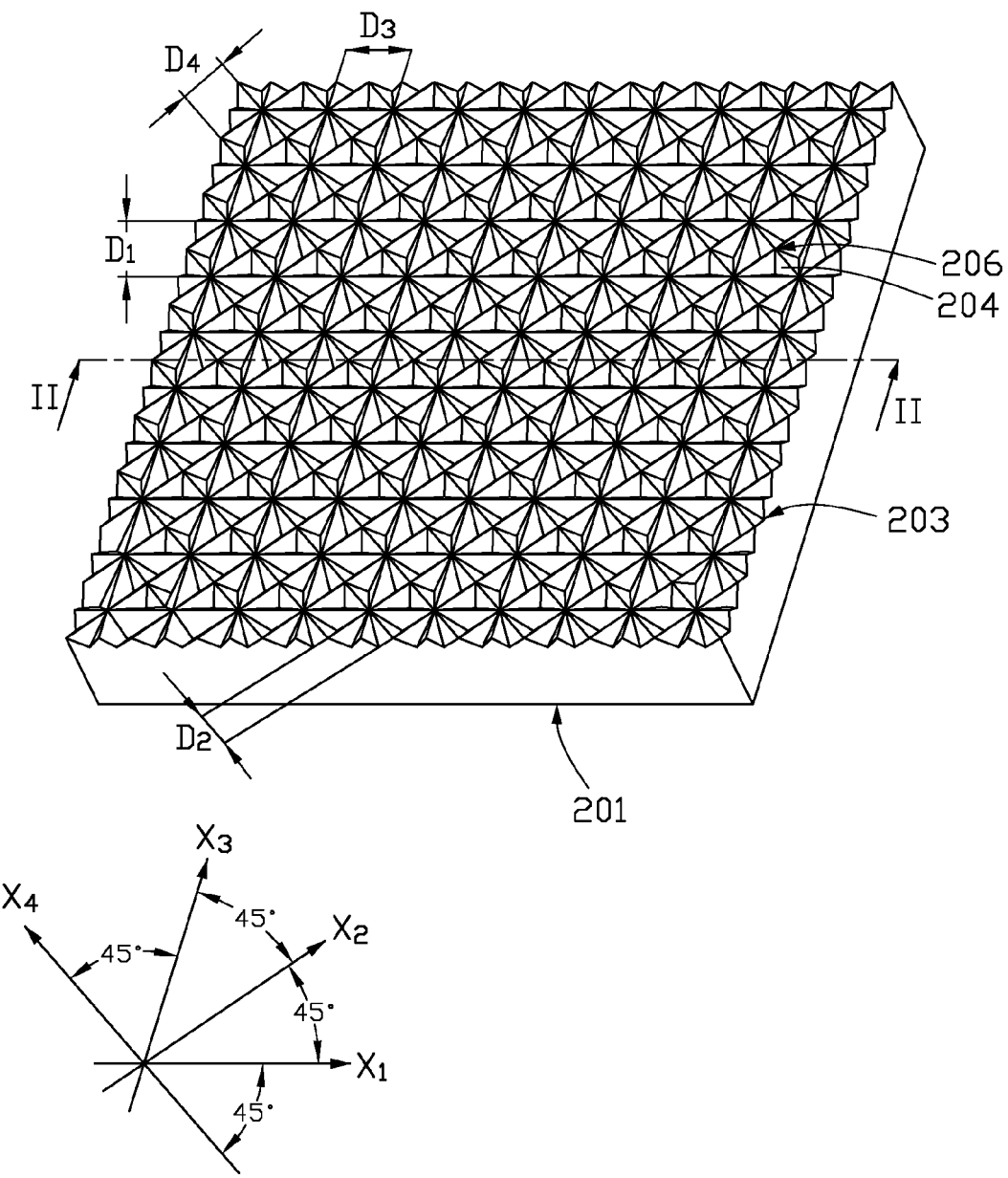
FIG. 1 is an isometric view of a prism sheet in accordance with a first exemplary embodiment of the present invention.
Figure 2:
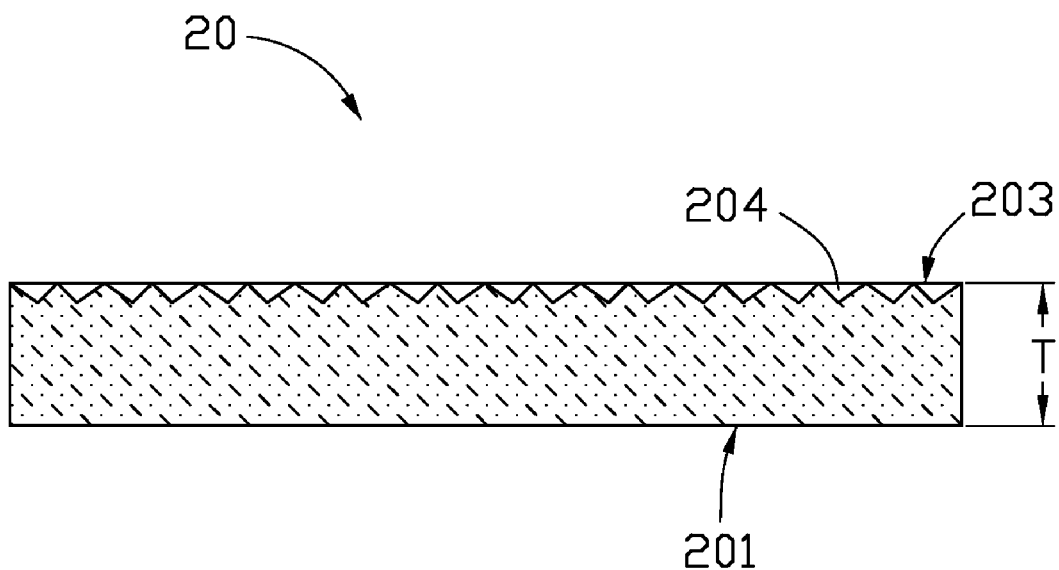
FIG. 2 is a side cross-sectional view taken along the line II-II of FIG. 1.

Referring to FIGS. 1 and 2, in a first embodiment, a prism sheet 20 includes a main body (not labeled). The main body includes a first surface 201 and a second surface 203. The first surface 201 and the second surface 203 are on opposite sides of the main body. The first surface 201 is flat. The second surface 203 defines a plurality of parallelogram microstructures 206 arranged in a matrix manner and each parallelogram microstructure 206 defines four adjacent triangular pyramid depressions 204.

The triangular pyramid depressions 204 are closely connected. In each parallelogram microstructure, the four triangular pyramid depressions 204 together with the sidewalls thereof cooperatively form a four-pointed star. The four-pointed stars are distributed in a matrix manner in the second surface 203.

In the illustrated embodiment, corresponding sidewalls on each side of adjacent triangular pyramid depressions 204 sharing a same edge collectively form upside down V-shaped ridges, namely, a plurality of first ridges, a plurality of second ridges, a plurality of third ridges, and a plurality of fourth ridges. The first V-shaped ridges are aligned in a first direction $X_1$. The second V-shaped ridges are aligned in a second direction $X_2$. The third V-shaped ridges are aligned in a third direction $X_3$. The fourth V-shaped ridges are aligned in a fourth direction $X_4$.

The first, second, third, and fourth V-shaped ridges intersect with each other and cooperatively define the triangular pyramid depressions 204 correspondingly. In other words, the first V-shaped ridges and the third V-shaped ridges intersect with each other and form a plurality of intersections. Each of the plurality of intersections also intersects the second V-shaped ridges and the fourth V-shaped ridges correspondingly.

A first angle is defined between the first direction $X_1$ and the second direction $X_2$. A second angle is defined between the first direction $X_2$ and the second direction $X_3$. The third angle is defined between the first direction $X_3$ and the second direction $X_4$. The fourth angle is defined between the first direction $X_4$ and the second direction $X_1$. The first, second, third and fourth angles are each 45 degrees.

A vertex angle of the first, second, third, and fourth V-shaped ridges taken along a plane perpendicular to an extending direction of the corresponding V-shaped ridge is in the range from about 80 degrees to about 100 degrees. A pitch of the adjacent V-shaped ridges aligned in the same direction is in the range from about 0.025 millimeters to about 1 millimeter. In the illustrated embodiment, the relations of the first, the second, the third, and the fourth V-shaped ridges are determined by the formula: $D_1=D_3=\sqrt{2}D_2=\sqrt{2}D_4$, wherein $D_1$ represents a pitch of the adjacent first V-shaped ridges, $D_2$ represents a pitch of the adjacent second V-shaped ridges, $D_3$ represents a pitch of the adjacent third V-shaped ridges, and $D_4$ represents a pitch of the adjacent fourth V-shaped ridges.

A thickness T of the sheet 20 is in the range from about 0.4 millimeters to about 4 millimeters. The prism sheet 20 can be made of a material selected from the group consisting of polycarbonate, polymethyl methacrylate, polystyrene, copolymer of methyl methacrylate and styrene, and any suitable combination of those. A mold used to manufacture the prism sheet 20 includes a plurality of triangular pyramid protrusions formed on a side surface. The triangular pyramid protrusions are configured to form the triangular pyramid depressions 204 on the second surface 203 of the prism sheet 20, such that both sides of the prism sheet can be produced at a same time per injection molding.

The prism sheet 20 can be employed in a backlight module (not shown) in such manner that the first surface 201 is facing the light source of the backlight module and the second surface 203 is away from the light sources. Light enters the prism sheet 20 via the first surface 201. Since the inner surfaces of the triangular pyramid depressions 204 are slanted, incident light that may have been internally reflected on a flat surface, are refracted, reflected, and diffracted. As a result, light outputted from the second surface 203 is more uniform than light outputted from a light output surface of a conventional prism sheet. Strong light spots of the light sources seldom occur. There is no need to add an extra upper light diffusion film between the prism sheet 20 and the liquid crystal display panel. Thus, the efficiency of light utilization is enhanced.

Referring to the Table 1 below, test samples are provided.

TABLE 1

| Test samples | Condition |
| --- | --- |
| 1 | LED + prism sheet 10 |
| 2 | LED + prism sheet 20 |

Figure 3:
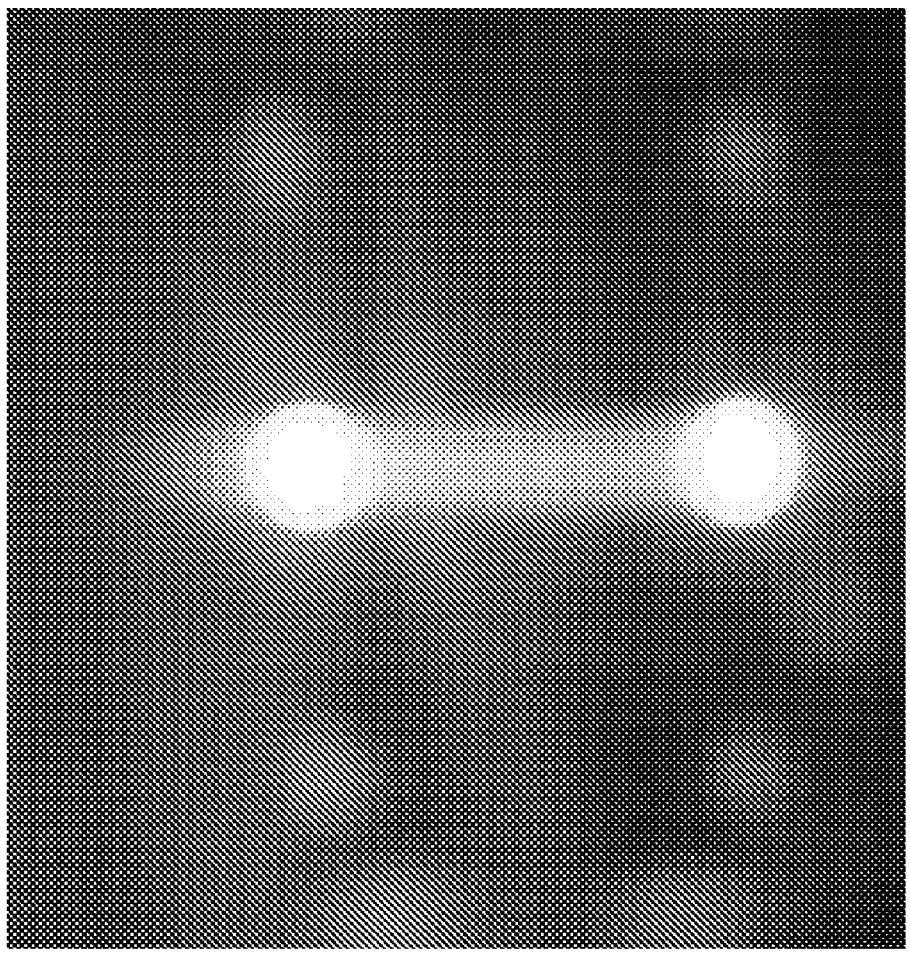
FIG. 3 is a photo showing an illumination distribution in a test of the backlight module using the conventional prism sheet of FIG. 8.
Figure 4:
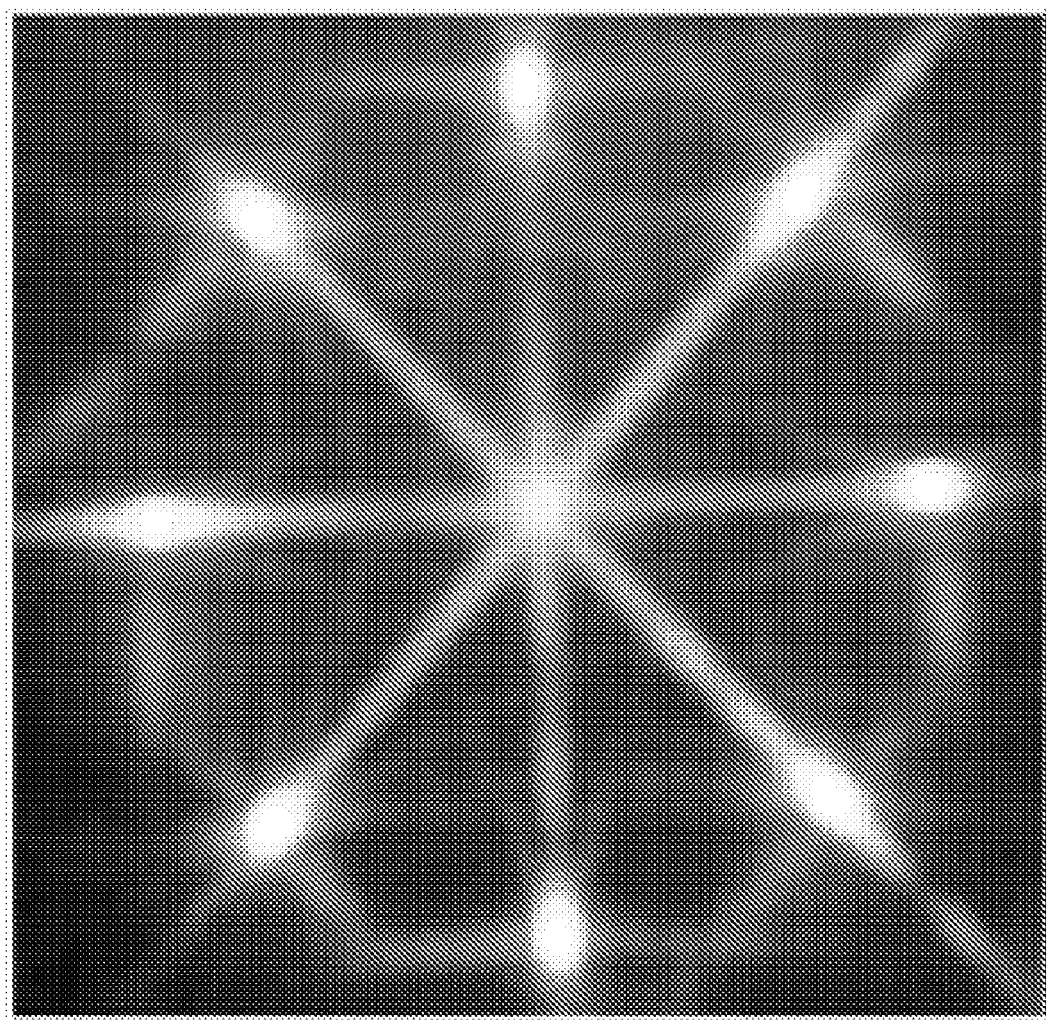
FIG. 4 is a photo showing an illumination distribution in a test of a backlight module using the prism sheet of FIG. 1.

Referring to the FIGS. 3 and 4, which reflect the test results from the test conditions in Table 1, as can be seen, light spots formed on the conventional prism sheet 10 is relatively strong, and in contrast light spots formed on the prism sheet 20 is relatively weak. Therefore, the test results show light emitting from the prism sheet 20 is more uniform. Therefore, when the prism sheet 20 is employed in a backlight module, strong light spots of the light sources seldom occur, more uniform light is achieved, there is no need to add an upper light diffusion film located above the prism sheet 20. Thus, the efficiency of light utilization is enhanced.

In addition, because the triangular pyramid depressions 204 form the first, the second, the third, and the fourth V-shaped ridges, light emitting from the second surface 203 would be concentrated in planes perpendicular to the first direction $X_1$, the second direction $X_2$, the third direction $X_3$, and the fourth direction $X_4$ respectively, thereby increasing the brightness (illumination) of the prism sheet 10 along a direction perpendicular to the second surface 203.

In addition, in contrast to the conventional prism sheet 10, the prism sheet 20 is integrally formed by injection molding technology. The prism sheet 20 has a better rigidity and mechanical strength than the conventional prism sheet because the prism sheet is formed as a whole unit integrally. Thus the prism sheet 20 has a relatively high reliability.

Figure 5:
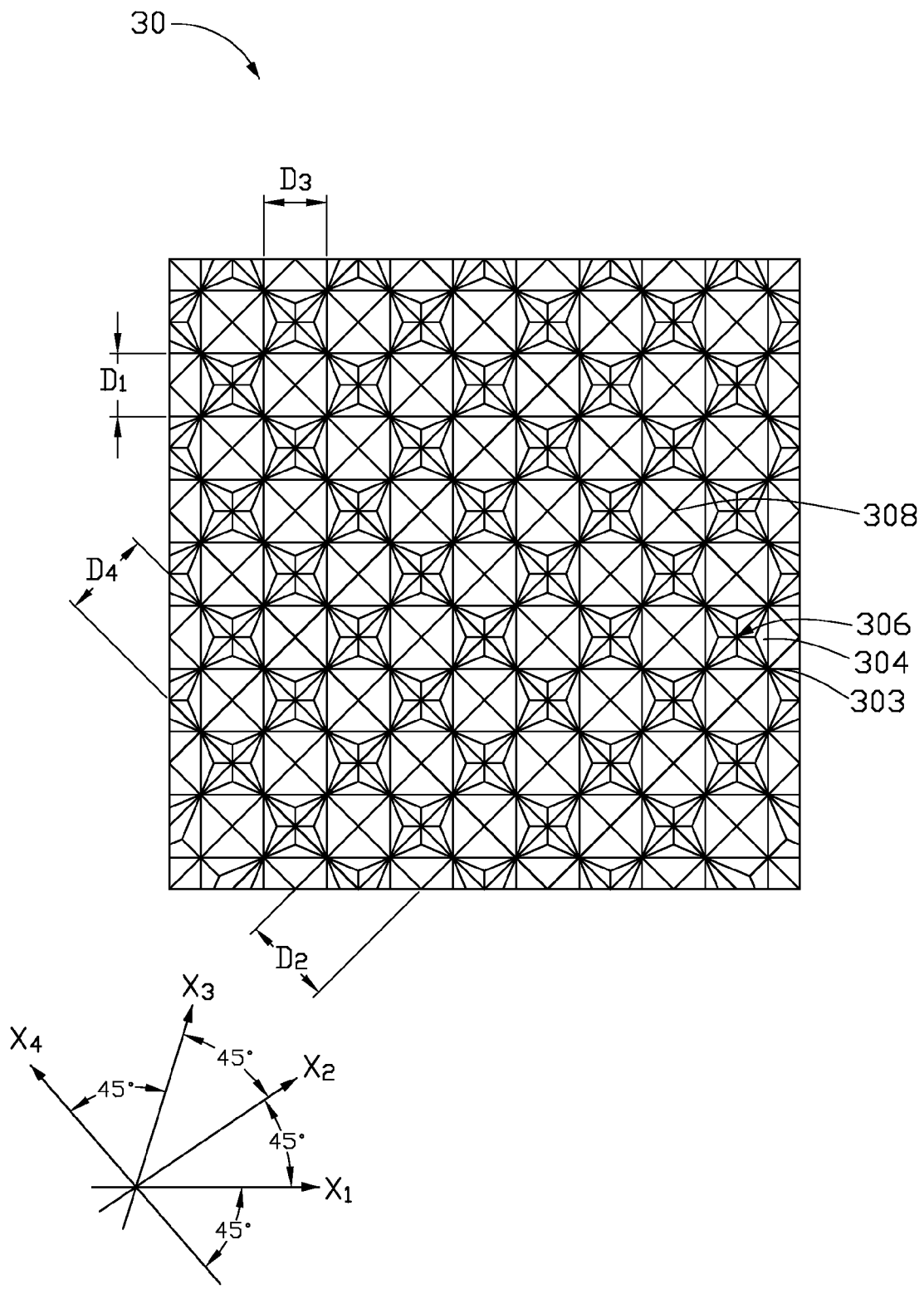
FIG. 5 is a top plan view of a prism sheet in accordance with a second exemplary embodiment of the present invention.

Referring to FIG. 5, a prism sheet 30 in accordance with a second embodiment is shown. The prism sheet 30 is similar in principle to the prism sheet 20 of the first embodiment, the second surface 303 defines a plurality of parallelogram microstructures 306 and each parallelogram microstructure 306 defines four adjacent triangular pyramid depressions 304. The prism sheet 30 also defines a plurality of quadrilateral pyramids 308. Each side of the parallelogram microstructures 306 is bordered with one side of one quadrilateral pyramid 308. In another words, a second V-shaped ridges and a fourth V-shaped ridges intersect with each other and form a plurality of intersections. First V-shaped ridges and third V-shaped ridges respectively pass through the intersections of the first V-shaped ridges and third V-shaped ridges at intervals. Pitches of adjacent V-shaped ridge of the four directions satisfy the following formula: $\sqrt{2}D_1=\sqrt{2}D_3=D_2=D_4$.

Figure 6:
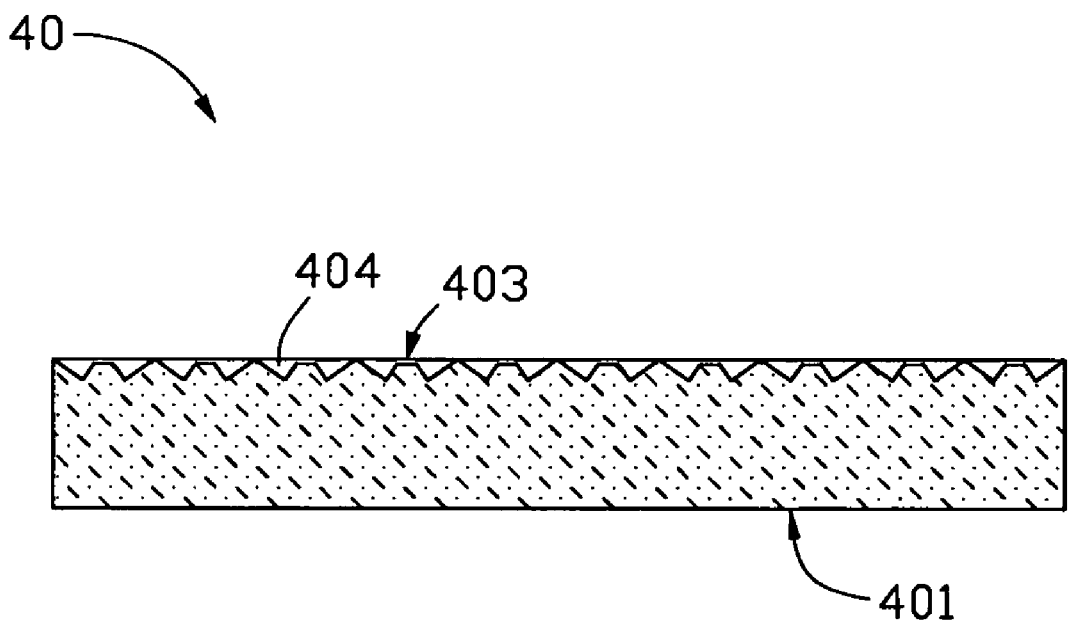
FIG. 6 is a side cross-sectional view of a prism sheet in accordance with a third exemplary embodiment of the present invention.
Figure 7:
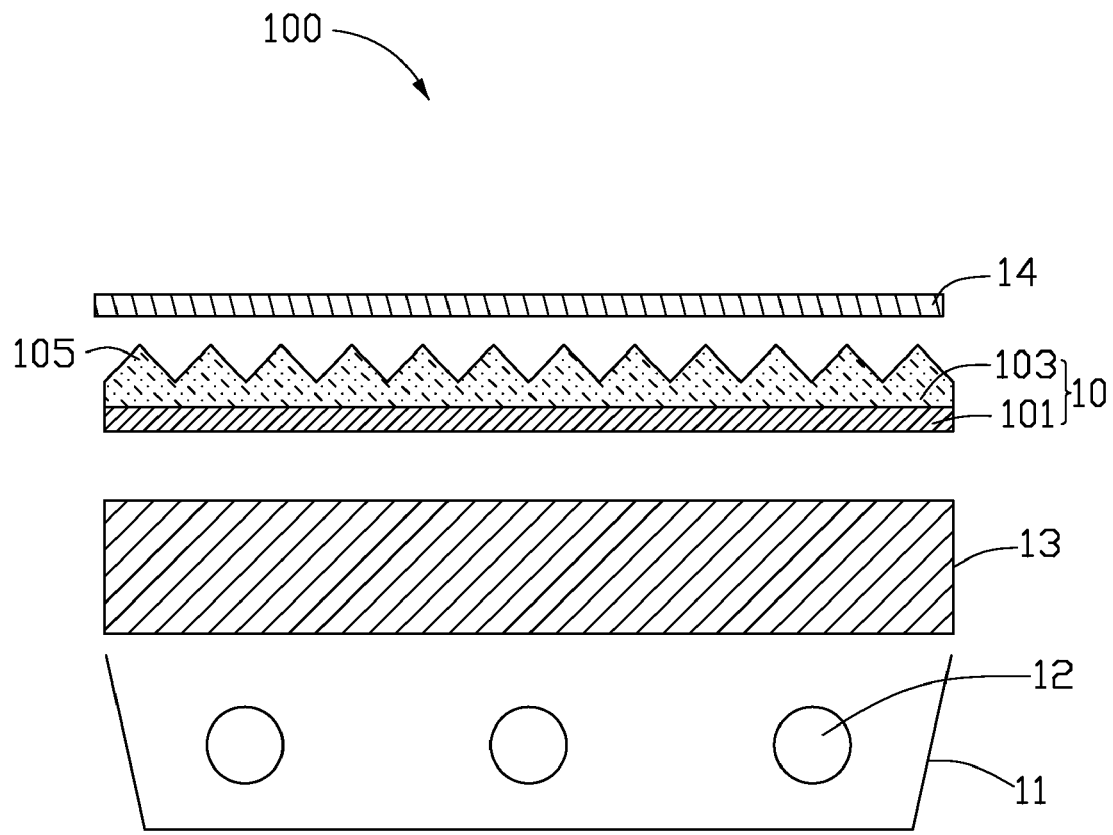
FIG. 7 is a side cross-sectional view of a conventional backlight module.
Figure 8:
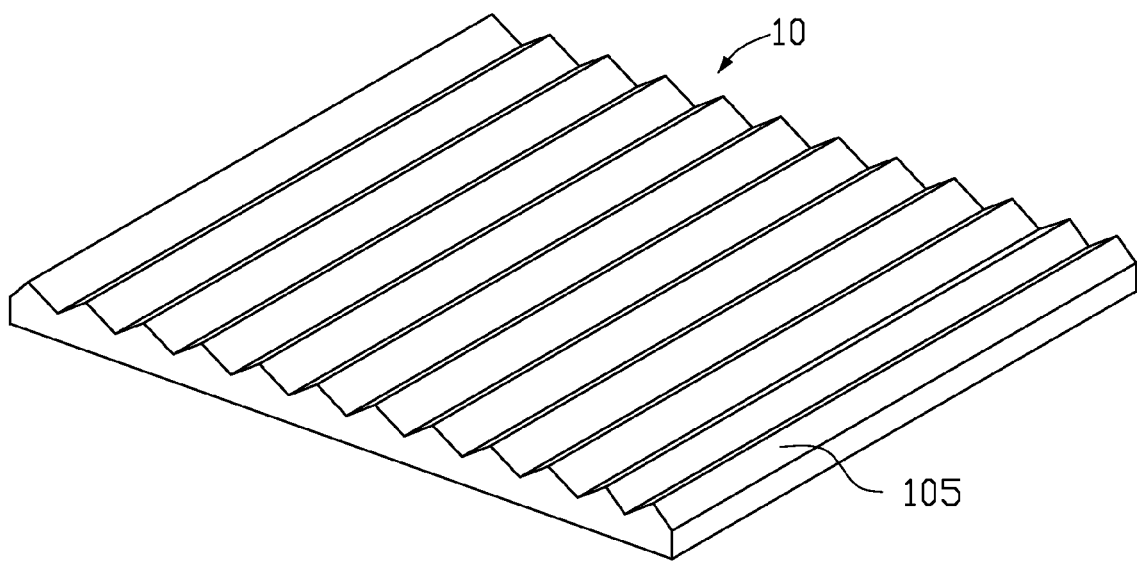
FIG. 8 is an isometric view of a prism sheet of the backlight module in FIG. 8.

Referring to FIG. 6, a prism sheet 40 in accordance with a third embodiment is shown. The prism sheet 40 is similar in principle to the prism sheet 20 of the first embodiment. The prism sheet 40 includes a first surface 401 and a second surface 403. A plurality of the triangular pyramid depressions 404 are defined in the second surface 403. However a top end of the V-shaped ridge is flat. Since the top end of the V-shaped ridges is flat, strength of the V-shaped ridges is enhanced. As a result, the prism sheet 40 has a higher reliability than a prism sheet with the V-shaped ridges, the top of which would be easily damaged in use.

Finally, while the preferred embodiment has been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet comprising:
   a transparent main body comprising:
      a first surface being flat; and
      a second surface being on another side of the main body opposite to the first surface, the second surface defining a plurality of parallelogram microstructures, each parallelogram microstructure defining four adjacent triangular pyramid depressions in an outline of the parallelogram microstructure, wherein each of the plurality of the parallelogram microstructures borders with four other of the plurality of the parallelogram microstructures, and sidewalls on each side of adjacent triangular pyramid depressions sharing a same edge collectively form a plurality of first V-shaped ridges aligned in a first direction, a plurality of second V-shaped ridge aligned in a second direction, a plurality of third V-shaped ridges aligned in a third direction, and a plurality of fourth V-shaped ridge aligned in a fourth direction, and each triangular pyramidal depression is defined by three of the four V-shaped ridges aligned in four different directions.

2. The prism sheet as claimed in claim 1, wherein an angle defined between the first direction and the second direction, an angle defined between the second direction and the third direction, an angle defined between the third direction and the fourth direction, and an angle defined between the fourth direction and the first direction are 45 degrees.

3. The prism sheet as claimed in claim 1, wherein a vertex angle of each of the V-shaped ridges is in the range from about 80 degrees to about 100 degrees.

4. The prism sheet as claimed in claim 1, wherein at least one portion of the top end of the V-shaped ridge is flat.

5. The prism sheet as claimed in claim 1, wherein a pitch of adjacent V-shaped ridges in the same direction is in the range from about 0.025 millimeters to about 1 millimeter.

6. The prism sheet as claimed in claim 1, wherein the thickness of the prism sheet is in the range from about 0.4 millimeters to about 4 millimeters.

7. The prism sheet as claimed in claim 1, wherein the prism sheet is made of a material selected from the group consisting of polycarbonate, polymethyl methacrylate, polystyrene, copolymer of methylmethacrylate and styrene, and combination thereof.

8. The prism sheet as claimed in claim 1, wherein the second surface further defines a plurality of quadrilateral pyramids, and each side of each of the plurality of parallelogram microstructures borders with one side of one of the quadrilateral pyramids.

* * * * *